(12) United States Patent
Carceller et al.

(10) Patent No.: US 10,584,217 B2
(45) Date of Patent: Mar. 10, 2020

(54) METHOD FOR PRODUCING A MATERIAL WITH A NETWORK OF AT LEAST TWO POLYMERS, A PRODUCT THEREOF AND USE OF THE PRODUCT

(71) Applicant: Kemira Oyj, Helsinki (FI)

(72) Inventors: Rosa Carceller, Espoo (FI); Matti Hietaniemi, Espoo (FI); Sacha Legrand, Oulu (FI); Mari Zabihian, Espoo (FI)

(73) Assignee: Kemira Oyj, Helsinki (FI)

( * ) Notice: Subject to any disclaimer, the term of this patent is extended or adjusted under 35 U.S.C. 154(b) by 7 days.

(21) Appl. No.: 15/739,751

(22) PCT Filed: May 11, 2016

(86) PCT No.: PCT/FI2016/050310
§ 371 (c)(1),
(2) Date: Dec. 25, 2017

(87) PCT Pub. No.: WO2016/207480
PCT Pub. Date: Dec. 29, 2016

(65) Prior Publication Data
US 2018/0194906 A1 Jul. 12, 2018

(30) Foreign Application Priority Data

Jun. 25, 2015 (FI) .................................... 20155500

(51) Int. Cl.
| | | |
|---|---|---|
| *D21H 21/18* | (2006.01) | |
| *C08J 3/24* | (2006.01) | |
| *C08F 271/00* | (2006.01) | |
| *D21H 21/10* | (2006.01) | |
| *D21H 17/54* | (2006.01) | |
| *C08L 39/02* | (2006.01) | |
| *C08L 33/26* | (2006.01) | |
| *C08L 33/02* | (2006.01) | |
| *D21H 17/33* | (2006.01) | |
| *D21H 17/37* | (2006.01) | |
| *C08F 20/56* | (2006.01) | |
| *C08F 26/02* | (2006.01) | |
| *D21H 17/45* | (2006.01) | |

(52) U.S. Cl.
CPC .............. *C08J 3/246* (2013.01); *C08F 20/56* (2013.01); *C08F 26/02* (2013.01); *C08F 271/00* (2013.01); *C08L 33/02* (2013.01); *C08L 33/26* (2013.01); *C08L 39/02* (2013.01); *D21H 17/33* (2013.01); *D21H 17/37* (2013.01); *D21H 17/375* (2013.01); *D21H 17/45* (2013.01); *D21H 17/54* (2013.01); *D21H 21/10* (2013.01); *D21H 21/18* (2013.01); *C08L 2205/04* (2013.01)

(58) Field of Classification Search
USPC ...................................................... 162/168.3
See application file for complete search history.

(56) References Cited

U.S. PATENT DOCUMENTS

| | | | |
|---|---|---|---|
| 4,421,602 A | 12/1983 | Brunnmueller et al. | |
| 5,145,559 A | 9/1992 | Auhorn et al. | |
| 5,753,759 A | 5/1998 | Hartmann et al. | |
| 8,021,516 B2 * | 9/2011 | Chen ................... | A61K 8/8158 162/164.1 |
| 2008/0000601 A1 | 1/2008 | Leduc et al. | |
| 2008/0196852 A1 | 8/2008 | Leduc et al. | |
| 2009/0314446 A1 | 12/2009 | Lu et al. | |
| 2010/0071863 A1 | 3/2010 | Sutman et al. | |
| 2011/0155339 A1 | 6/2011 | Brungardt et al. | |
| 2014/0110071 A1 | 4/2014 | Furman et al. | |
| 2015/0057411 A1 | 2/2015 | Destarac et al. | |
| 2018/0023253 A1 * | 1/2018 | Carceller ................ | C08L 33/26 162/164.6 |

FOREIGN PATENT DOCUMENTS

| | | |
|---|---|---|
| CN | 1382160 A | 11/2002 |
| CN | 101472966 A | 7/2009 |
| CN | 104311841 A1 | 1/2015 |
| CN | 104418981 A | 3/2015 |
| WO | 2006027242 A1 | 3/2006 |

OTHER PUBLICATIONS

Finnish Patent and Registration Office, Search report issued in FI20155500, dated Feb. 5, 2016.

* cited by examiner

*Primary Examiner* — Mark Halpern
(74) *Attorney, Agent, or Firm* — Berggren LLP

(57) ABSTRACT

The present invention relates to an interpenetrating polymer network (IPN) material comprising a copolymer of vinylamine-vinylformamide, and a homo-polymer or a copolymer of at least one monomer selected from acrylamide or derivatives thereof, acrylic acid or derivatives thereof, or a mixture thereof forming the IPN material together with the copolymer of vinylamine-vinyl-formamide. The present invention further relates to a process for producing the IPN material, and to use of the IPN material in paper industry.

17 Claims, No Drawings

METHOD FOR PRODUCING A MATERIAL WITH A NETWORK OF AT LEAST TWO POLYMERS, A PRODUCT THEREOF AND USE OF THE PRODUCT

PRIORITY

This application is a U.S national application of PCT-application PCT/FI2016/050310 filed on May 11, 2016 and claiming priority of Finnish national application FI 20155500 filed on Jun. 25, 2015, the contents of all of which are incorporated herein by reference.

FIELD OF THE INVENTION

The present invention relates to a process for producing an interpenetrating polymer network (IPN) material and a product thereof. The present invention further relates to use of the IPN material in paper industry.

BACKGROUND ART

Paper industry continuously strives to improve paper and paperboard quality, increase process speeds, reduce manufacturing costs etc. Various chemicals, synthetic and naturally occurring, are used to treat pulp in order to improve, for example, retention, fixing and drainage, and to create physical properties such as wet and dry strength of the final paper product. Typically synthetic chemicals, synthetic polymers, are tailored for one purpose, for example either for giving strength or drainage properties.

A retention agent is a process chemical that improves retention of a functional chemical in a substrate. The result is that totally fewer chemicals are used to get the same effect of the functional chemical and fewer chemicals goes to waste.

Drainage additives are materials that increase drainage rate of water from pulp slurry on a wire. Common drainage additives are cationic starch and polyacrylamide.

Wet strength additives ensure that when paper becomes wet, it retains its strength. This is especially important in a tissue paper. Examples of wet strength additives are urea-formaldehyde (UF), melamine-formaldehyde (MF) and polyamidoamide-epichlorohydrin (PAE).

Dry strength additives are chemicals that improve paper strength of normal or not wet condition. Typical chemicals used are starch and polyacrylamide (PAM) derivatives. The starch and PAM derivatives may be anionically or cationically charged. By using cationic starch or PAM, negatively charged fibers can bind with the cationic starch or PAM and thus increase interconnections between the fibers, and thus strength.

For example, U.S. Pat. No. 4,421,602 discloses use of partially hydrolyzed homopolymers of N-vinylformamide as retention and drainage aid and flocculant in papermaking. EP 438707 discloses use of hydrolyzed homo- or copolymers of N-vinylformamide as fixing agent in papermaking.

US 2008/0000601 A1 discloses a process for production of paper, board and cardboard by draining a paper stock on a wire in the presence of at least one polymer as retention aid with sheet formation and drying of the sheets, wherein the sheet formation is carried out in absence of inorganic flocculants, and (a) polymers comprising vinylamine units and/or polyvinylformamide, and (b) at least one cationic or nonionic polyacrylamide and/or one cationic or nonionic polymethacrylamide are used as retention aids.

An Interpenetrating Polymer Network (IPN) is a material with a network of at least two polymers which are at least partially interlaced on a molecular scale. The polymers cannot be separated unless chemical bonds are broken. The polymers can be envisioned to be entangled in such a way that they are concatenated and cannot be pulled apart, but substantially unbonded to each other by chemical bonds. In other words, the interpenetrating polymer networks are a combination of at least two polymers, wherein at least one of the polymers is synthesized (polymerized) and/or cross-linked in the immediate presence of the other(s).

Simply mixing two or more polymers does not create an interpenetrating polymer network but a polymer blend, nor does creating a polymer network out of at least one kind of monomer(s) which are bonded to each other to form one network (heteropolymer or copolymer).

For example, CN104311841 relates to a method for preparing an interpenetrating polymer network. The method comprises the following steps: mixing acrylamide and sodium alginate, adding a cross-linking agent and an initiator, performing polymerization of acrylamide, forming a polyacrylamide gel network with sodium alginate.

Even though there are available IPN materials, there is still a need for novel IPN materials to be used as additives in production of paper and paperboard having improved properties.

SUMMARY OF THE INVENTION

The present invention relates to a process for producing an interpenetrating polymer network (IPN) material according to claim 1.

The present invention also relates to an IPN material according to claim 11.

The inventors have surprisingly found that an interpenetrating polymer network IPN) material comprising a copolymer of vinylamine-vinylformamide, and a homopolymer or a copolymer of at least one monomer selected from acrylamide or derivatives thereof, acrylic acid or derivatives thereof, or a mixture thereof forming the IPN material together with the copolymer of vinylamine-vinylformamide can be used as an additive in paper industry for increasing process speed and improving quality of final products.

For example, the IPN material of the present invention improves drainage time, strength and fixing. The material generates better performance, such as strength and drainage, compared to conventional blended polymers. The material has as an advantage that the material has properties of all of the components (copolymer of vinylamine-vinylformamide and the homopolymer or the copolymer). That is, the material of the present invention brings simultaneously for example both strength and drainage properties. In addition, the IPN material is easily produced with the method of the present invention.

DETAILED DESCRIPTION

By wording "an interpenetrating polymer network (IPN) material" is meant a combination of a copolymer of vinylamine-vinylformamide, and a homo- or a copolymer produced from at least one monomer selected from a group consisting of acrylamide or derivatives thereof, acrylic acid or derivatives thereof, or a mixture thereof forming the IPN material together with the copolymer of vinylamine-vinylformamide. The homopolymer or copolymer is produced (polymerized) or polymerized and cross-linked in the immediate presence of the copolymer of vinylamine-vinylformamide (in situ) to form the IPN material.

By term "at least one monomer" is meant single type monomer, two different types of monomers, three different types of monomers, or more different types of monomers. In other words, the monomer can be of one type, or the monomers can be of two or more different types. Polymerization of single type monomer produces homopolymer. Polymerization of two or more different types of monomers produces copolymer(s).

In first aspect of the present invention there is provided a process for producing an interpenetrating polymer network (IPN) material.

More particularly there is provided a process for producing an IPN material comprising
i) providing an aqueous solution comprising a copolymer of vinylamine-vinylformamide and at least one monomer selected from a group consisting of acrylamide or derivatives thereof, acrylic acid or derivatives thereof, or a mixture thereof;
ii) polymerizing in situ the at least one monomer selected from the group consisting of acrylamide or derivatives thereof, acrylic acid or derivatives thereof, or a mixture thereof to form the IPN material together with the copolymer of vinylamine-vinylformamide; and
iii) obtaining the IPN material.

In step i) is provided an aqueous solution comprising a copolymer of vinylamine-vinylformamide and at least one monomer selected from a group consisting of acrylamide or derivatives thereof, acrylic acid or derivatives thereof, or a mixture thereof.

The aqueous solution may be obtained by mixing the copolymer of vinylamine-vinylformamide in water together with the at least one monomer.

In one embodiment the copolymer of vinylamine-vinylformamide is first mixed with water, followed by addition of the at least one monomer and mixing the formed mixture.

In other embodiment, first the at least one monomer is mixed with water, followed by addition of copolymer of vinylamine-vinylformamide and mixing the formed mixture.

Yet in other embodiment the copolymer of vinylamine-vinylformamide is mixed with water, and the at least one monomer is mixed separately with water, and the two mixtures are combined to obtain the aqueous solution comprising the copolymer of vinylamine-vinylformamide and the at least one monomer.

The mixing method can be any suitable mixing method, such as magnetic stirrer.

The at least one monomer is selected from the group consisting of acrylamide or derivatives thereof, acrylic acid or derivatives thereof, or a mixture thereof.

The acrylamide derivative is preferably selected from a group consisting of N-methylolacrylamide, N-methylol (meth)acrylamide, N,N-dimethylaminopropyl acrylamide, N,N-dimethylaminopropylacrylamide, N,N-dimethylaminopropylmethacrylamide, N,N-dimethylaminoethylacrylamide, N-[2-(dimethylamino)-1,1-dimethylethyl]acrylamide.

The acrylic acid derivative is preferably cationic acrylic acid derivative or anionic acrylic acid derivative.

Preferably the cationic acrylic acid derivative is selected from a group consisting of 2-(acryloyloxy)ethyl]trimethylammonium chloride, (3-acrylamidopropyl)trimethyl ammonium chloride, 2-(diethylamino)ethyl acrylate, 2-(dimethylamino)ethyl acrylate, [2-(methacryloyloxy)ethyl]-trimethylammonium chloride, [3-(methacryloylamino) propyl]trimethylammonium chloride; more preferably [2-(methacryloyloxy)ethyl]-trimethylammonium chloride.

Preferably the anionic acrylic acid derivative is selected from a group consisting of acrylic acid, acryloyl chloride, methacrylic acid, 2-acrylamido-2-methylpropane sulfonic acid, sodium 2-(acryloylamino)2-methyl-1-propanesulfonate or itaconic acid.

In one embodiment the at least one monomers are acrylamide and cationic acrylic acid derivative. Molar ratio of the acrylamide and cationic acrylic acid derivative is 20:1-1:20, preferably 12:1-1:12, and more preferably 10:1-1:10, such as 9.5:1. Most preferably the at least one monomers are acrylamide and [2-(acryloyloxy)ethyl]-trimethyl ammonium chloride.

Optionally, an acid, such as HCl, or a base can be added to the aqueous solution for controlling pH of the solution. The pH is preferably adjusted to 2-9, more preferably to 2-8.

Properties of the IPN material can be altered by altering hydrolysis degree of the copolymer of vinylamine-vinylformamide. Such properties are cationicity, hydrophilicity/hydrophobicity, structure in the space and interaction with other chemical functionalities.

The copolymer of vinylamine-vinylformamide may have a degree of hydrolysis 1-99%, preferably 5-95%, more preferably 14-55%, even more preferably 21-50%. That is, part of the NHCOH group(s) of the vinylamine-vinylformamide copolymer has been hydrolyzed to $NH_2$.

In one embodiment the copolymer of vinylamine-vinylformamide has a degree of hydrolysis 99-100%. When the hydrolysis degree is 100% all of the NHCOH group(s) of the vinylamine-vinylformamide copolymer have been hydrolyzed to $NH_2$. In other words, vinylamine-vinylformamide copolymer having hydrolysis degree 100% is a vinylamine homopolymer.

The hydrolysis degree can be determined using $^1H$ NMR spectroscopy. After hydrolysis, formic acid is formed and the characteristic peak from formic acid (aldehyde) is used to determine the hydrolysis degree.

Molecular mass of the copolymer of vinylamine-vinylformamide is preferably 200 000-8 000 000 Da, more preferably 600 000-5 000 000 Da, even more preferably 1 200 000-4 500 000 Da.

In one embodiment the copolymer of vinylamine-vinylformamide is produced with an acid hydrolysis reaction of poly(N-vinylformamide) before step i). The copolymer of vinylamine-vinylformamide is also commercially available.

Amount of the copolymer of vinylamine-vinylformamide in the solution can be chosen depending on wanted properties of the IPN material. In one embodiment the amount of the copolymer of vinylamine-vinylformamide is 0.1-75 wt. %, preferably 1-20 wt. % based on the weight of the monomers in the solution.

In step ii) the at least one monomer is polymerized (in situ) to form the IPN material together with the copolymer of vinylamine-vinylformamide.

The at least one monomer is polymerized in the aqueous solution in the presence of the copolymer of vinylamine-vinylformamide to form the IPN material. That is to say, the at least one monomer is polymerized in situ.

The in situ polymerized polymer (formed polymer) can be homopolymer or copolymer, depending on the monomers.

In one embodiment the formed polymer is cross-linked in situ to form cross-linked IPN material together with the copolymer of vinylamine-vinylformamide. Preferably the cross-linking agent is selected from a group consisting of N,N'-methylenebisacrylamide 1,4-bis(acryloyl)piperazine, N,N'-(1-methyl-1,2-ethanediyl)bis(2-propenamide), N,N'- propylidenebis(2-propenamide), N,N'-butylidenebis(2-propenamide), N,N'-1,12-dodecanediylbis(2-propenamide), N,N'-1,9-nonanediylbis(2-propenamide), N,N'-1,5-pentanediylbis(2-propenamide), N,N'-1,4-butanediylbis(2-propenamide), N,N'-1,6-hexanediylbis(2-propenamide), N,N'-ethylidenebis(2-propenamide), N,N'-1,3-propanediylbis(2-propenamide), N,N'-1,2-(2-propenamide), N,N'-1,4-cyclohexanediylbis(2-propenamide), N,N'-1,8-octanediylbis(2-propenamide), N,N'-bisacryloyly imidazoline, ethyleneglycol dimethacrylate, 1,4-diacroyl piperazine, pentaerythritol triacrylate, trimethylpropane trimethylacrylate, pentaerythritol tetraacrylate, preferably N,N'-methylenebisacrylamide, preferably N,N'-methylenebisacrylamide.

In one embodiment after the polymerization forming the IPN material with the copolymer of vinylamine-vinylformamide, at least one additional monomer is added to the solution containing the formed IPN material, and polymerized in situ to form an IPN material of three polymers.

The polymerization of step ii) may be initiated with one or more suitable initiators. The initiators can be selected from redox pair initiators and thermal initiators.

Examples of redox pair initiators are peroxides such as t-butyl hydroperoxide (TBHP), cumene, hydrogen peroxide, hydroperoxide, di-t-butyl peroxide, diisopropyl benzene hydroperoxide, p-menthane hydroperoxide, 1,1,3,3-tetramethylbutyl hydroperoxide, 2,5-dimethylhexane-2,5-dihydroperoxide, benzoyl peroxide and methylethyl ketone peroxide, persulfates such as ammonium persulfate, sodium persulfate and potassium persulfate, sulfates such as ferrous ammonium sulfate, peracetates such as potassium peracetate and sodium peracetate, persulfates, peracids, percarbonates such as potassium percarbonate and sodium percarbonate, sodium bromate, sodium sulphite, potassium permanganate, sodium metabisulfite, or mixtures thereof, preferably the redox pair initiator is t-butyl hydroperoxide (TBHP).

Examples of thermal initiators are azo-initiators such as azo-bis-isobutyronitrile, 4,4-azobis-4-cyanovaleric acid, 2,2'-Azobis(2-methylpropionamidine)dihydrochloride, 2,2'-azobis-(2,4-dimethyl valeronitrile) (ABDV), 2,2'-azobis (methyl isobutyrate), 2,2'-azobis(2-methylpropionamidine) dihydrochloride, 2,2'-azobis[2-(2-imidazolin-2-yl)propane] dihydrochloride, 2,2'-azobisisobutyronitrile (AIBN) and 2,2'-azobis(cyclohexylcarbonitrile) (ABCC), benzoyl peroxide, acetyl peroxide, cumyl peroxide, t-butyl peroxide, t-butyl hydroperoxide, cumyl hydroperoxide, and t-butyl perbenzoate, or mixtures thereof, preferably the thermal initiator is AIBN.

The step ii) may be performed under an inert atmosphere, preferably under $N_2$ atmosphere. The step ii) may also be performed in lowered or raised temperature, or as an adiabatic reaction.

In step iii) the IPN material is obtained. The obtained IPN material is optionally dried with any conventional method such as oven. The dried IPN material can be optionally milled to obtain the IPN material in powder form. In a preferred embodiment dried IPN material is milled.

In an exemplary embodiment, the process for producing the IPN material comprises mixing copolymer of vinylamine-vinylformamide having hydrolysis degree of 30-45% together with acrylamide and cationic acrylic acid and optionally a cross-linking agent and water. Optionally pH of the solution is adjusted to neutral. The mixture is mixed for 10-60 min at elevated temperature. Optionally reaction vessel is sealed and polymerization is conducted under inert atmosphere, such as $N_2$ atmosphere. Preferably, initiator(s) is added and reaction mixture is stirred for 15 min to 8 hours at elevated temperature. Formed IPN material is obtained, and optionally dried and milled to produce IPN material in powder form.

In second aspect of the present invention there is provided an IPN material.

The IPN material is a combination of copolymer of vinylamine-vinylformamide, and a homo- or a copolymer of at least one monomer selected from a group consisting of acrylamide or derivatives thereof, acrylic acid or derivatives thereof, or a mixture thereof, wherein the homopolymer or copolymer is synthesized (polymerized) or synthesized and cross-linked in the immediate presence of the copolymer of vinylamine-vinylformamide (in situ).

More particularly there is provided an IPN material comprising
a copolymer of vinylamine-vinylformamide; and
a homopolymer or a copolymer of at least one monomer selected from acrylamide or derivatives thereof, acrylic acid or derivatives thereof, or a mixture thereof forming the IPN material together with the copolymer of vinylamine-vinylformamide.

The homopolymer or the copolymer is may be cationic or anionic, preferably cationic.

The acrylamide derivative is preferably selected from a group consisting of N-methylolacrylamide, N-methylol (meth)acrylamide, N,N-dimethylaminopropyl acrylamide, N,N-dimethylaminopropylacrylamide, N,N-dimethylaminopropylmethacrylamide, N,N-dimethylaminoethylacrylamide, N-[2-(dimethylamino)-1,1-dimethylethyl]acrylamide.

The acrylic acid derivative is preferably cationic acrylic acid derivative or anionic acrylic acid derivative.

Preferably the cationic acrylic acid derivative is selected from a group consisting of 2-(acryloyloxy)ethyl]trimethylammonium chloride, (3-acrylamidopropyl)trimethyl ammonium chloride, 2-(diethylamino)ethyl acrylate, 2-(dimethylamino)ethyl acrylate, [2-(methacryloyloxy)ethyl]-trimethylammonium chloride, [3-(methacryloylamino) propyl]trimethylammonium chloride; more preferably [2-(methacryloyloxy)ethyl]-trimethylammonium chloride.

Preferably the anionic acrylic acid derivative is selected from a group consisting of acrylic acid, acryloyl chloride, methacrylic acid, 2-acrylamido-2-methylpropane sulfonic acid, sodium 2-(acryloylamino)2-methyl-1-propanesulfonate or itaconic acid.

In one embodiment the polymer is a copolymer of acrylamide and cationic acryl acid derivative. Molar ratio of the acrylamide and cationic acrylic acid derivative is 20:1-1:20, preferably 12:1-1:12, and more preferably 10:1-1:10, such as 9.5:1. Most preferably the at least one monomers are acrylamide and [2-(acryloyloxy)ethyl]-trimethyl ammonium chloride.

Standard viscosity of the IPN material is preferably 1-5 cP.

The standard viscosity is measured from an aqueous solution having 0.16 wt % of the IPN material. The IPN material is dispersed in water for 5 minutes, and after that it is stirred for 25 min at 350 rpm. Then, 117.5 g of NaCl salt aqueous solution (17.5 wt %) is added and stirred for 5 minutes. The solution is filtered through 10 cm diameter, 250 micron stainless steel mesh sieve. 16 ml of the filtered solution is measured on a Brookfield viscometer using the UL adapter at 25° C.

In one embodiment charge density (meq/g (Mutek)) of the IPN material is 4.1-0.4 meq/g at acidic pH (pH=3); and 2.5-0.4 meq/g at neutral pH (pH=7). The charge densities are measured from 0.5 wt. % aqueous solution.

Amount of the copolymer of vinylamine-vinylformamide in the IPN material is 0.1-75 wt. %, preferably 1-20 wt. % based on the weight of the IPN material.

Properties of the IPN material can be altered by altering hydrolysis degree of the copolymer of vinylamine-vinylformamide. Such properties are cationicity, hydrophilicity/hydrophobicity, structure in the space and interaction with other chemical functionalities.

The copolymer of vinylamine-vinylformamide may have a degree of hydrolysis 1-99%, preferably 5-95%, more preferably 14-55%, even more preferably 21-50%. That is, part of the NHCOH group(s) of the vinylamine-vinylformamide copolymer has been hydrolyzed to $NH_2$.

In one embodiment the copolymer of vinylamine-vinylformamide has a degree of hydrolysis 99-100%. When the hydrolysis degree is 100% all of the NHCOH group(s) of the vinylamine-vinylformamide copolymer have been hydrolyzed to $NH_2$. In other words, vinylamine-vinylformamide copolymer having hydrolysis degree 100% is a vinylamine homopolymer.

Molecular mass of the copolymer of vinylamine-vinylformamide is preferably 200 000-8 000 000 Da, more preferably 600 000-5 000 000 Da, even more preferably 1 200 000-4 500 000 Da.

The homo- or copolymer may optionally be cross-linked. When the homo- or copolymer is cross-linked the material with the IPN material comprises additionally the cross-linker. The cross-linking agent may be selected from a group consisting of N,N'-methylenebisacrylamide 1,4-bis(acryloyl)piperazine, N,N'-(1-methyl-1,2-ethanediyl)bis(2-propenamide), N,N'-propylidenebis(2-propenamide), N,N'-butylidenebis(2-propenamide), N,N'-1,12-dodecanediylbis(2-propenamide), N,N'-1,9-nonanediylbis(2-propenamide), N,N'-1,5-pentanediylbis(2-propenamide), N,N'-1,4-butanediylbis(2-propenamide), N,N'-1,6-hexanediylbis(2-propenamide), N,N'-ethylidenebis(2-propenamide), N,N'-1,3-propanediylbis(2-propenamide), N,N'-1,2-ethanediylbis(2-propenamide), N,N'-1,4-cyclohexanediylbis(2-propenamide), N,N'-1,8-octanediylbis(2-propenamide), N,N'-bisacryloyly imidazoline, ethyleneglycol dimethacrylate, 1,4-diacroyl piperazine, pentaerythritol triacrylate, trimethylpropane trimethylacrylate, pentaerythritol tetraacrylate, preferably N,N'-methylenebisacrylamide, preferably N,N'-methylenebisacrylamide.

The IPN material may comprise also initiator(s). The initiators can be selected from redox pair initiators and thermal initiators.

Examples of redox pair initiators are peroxides such as t-butyl hydroperoxide (TBHP), cumene, hydrogen peroxide, hydroperoxide, di-t-butyl peroxide, diisopropyl benzene hydroperoxide, p-menthane hydroperoxide, 1,1,3,3-tetramethylbutyl hydroperoxide, 2,5-dimethylhexane-2,5-dihydroperoxide, benzoyl peroxide and methylethyl ketone peroxide, persulfates such as ammonium persulfate, sodium persulfate and potassium persulfate, sulfates such as ferrous ammonium sulfate, peracetates such as potassium peracetate and sodium peracetate, persulfates, peracids, percarbonates such as potassium percarbonate and sodium percarbonate, sodium bromate, sodium sulphite, potassium permanganate, sodium metabisulfite, or mixtures thereof, preferably the redox pair initiator is t-butyl hydroperoxide (TBHP).

Examples of thermal initiators are azo-initiators such as azo-bis-isobutyronitrile, 4,4-azobis-4-cyanovaleric acid, 2,2'-Azobis(2-methylpropionamidine)dihydrochloride, 2,2'-azobis-(2,4-dimethyl valeronitrile) (ABDV), 2,2'-azobis (methyl isobutyrate), 2,2'-azobis(2-methylpropionamidine) dihydrochloride, 2,2'-azobis[2-(2-imidazolin-2-yl)propane] dihydrochloride, 2,2'-azobisisobutyronitrile (AIBN) and 2,2'-azobis(cyclohexylcarbonitrile) (ABCC), benzoyl peroxide, acetyl peroxide, cumyl peroxide, t-butyl peroxide, t-butyl hydroperoxide, cumyl hydroperoxide, and t-butyl perbenzoate, or mixtures thereof, preferably the thermal initiator is AIBN.

The IPN material may be in form of emulsion, solution, dispersion or solid, preferably in form of powder.

Preferably the IPN material is produced with the above described process.

In third aspect of the present invention there is provided use of the IPN material.

More particularly there is provided use of the IPN material in paper industry.

The IPN material described above or the IPN material produced with the process described above may be used as drainage, dewatering, retention, fixing, sludge dewatering, sizing or dry strength additive in paper industry.

In one embodiment dosage of the IPN material is 0.1-5 kg as dry material/ton of dry pulp, preferably 0.1-2 kg as dry material/ton of dry pulp, and more preferably 0.2-0.9 kg as dry material/ton of dry pulp.

The IPN material is typically added to pulp before web forming. It can be added to the thick stock (consistency of pulp is more than 2%) or to the thin stock (consistency of pulp is at most 2%).

In one embodiment the IPN material is used in processes where recycled fibers are used. The fiber may have high conductivity conditions of over 3 mS/cm and/or high ash content of over 15%.

The IPN material may be used together with or without microparticles, or together with an additional anionic or cationic acrylamide copolymer. The IPN material may also be used without a fixative agent.

EXAMPLES

General Procedure for the Preparation of an Interpenetrating Polymer Network (IPN) Material According to the Present Invention The reaction was performed with continuous flow of nitrogen gas. In flask, copolymer of vinylamine-vinylformamide was mixed together with acrylamide, cationic acrylic acid, MBA and water. pH of the solution was adjusted to neutral. The reaction was mixed well for 30 min at elevated temperature. An initiator was added and the solution was kept at elevated temperature for 2 h. The formed polymer product (the IPN material) was then cooled to room temperature and formed polymer product was analysed.

Preparation of Cationic Polyacrylamide, and Blend of Cationic Polyacrylamide and Copolymer of Vinylamine-Vinylformamide (Comparative Examples)

Cationic polyacrylamide was made in the same way as the IPN material, but with only difference being that the copolymer of vinylamine-vinylformamide was not present in the reaction mixture. That is, the cationic polyacrylamide was made in water, not in aqueous solution containing copolymer of vinylamine-vinylformamide. Obtained product was powder cationic polyacrylamide.

A portion of the prepared cationic polyacrylamide and copolymer of vinylamine-vinylformamide were dispersed in water under stirring, using same amounts that were used when the IPN material was prepared with the above described procedure, for producing a blend of polyacrylamide and copolymer of vinylamine-vinylformamide.

Characterization

Viscosities, insolubles and charges were measured from the prepared IPN material of the present invention and cationic polyacrylamide.

Salt viscosity (cP) was determined using a Brookfield Digital Viscometer following the standard instructions (manual M/92-021-P405).

Insolubles were measured using a stainless steel sieve with aperture 500 microns. The sieve was filled with the aqueous sample solution (made with the above method in salt viscosity measurement) and allowed to drain. The sieve was washed with 1000 ml of cold water. Total drainage time not to exceed 5 minutes. Gels and/or particles remaining on the sieve were visually counted.

Charge density measurement (meq/g) was determined using a Mütek™ particle charge detector (PCD-03) from BTG Mütek GmbH. The standards used were the cationic solution poly-DADMAC (c=0.001 mol/L) and the anionic solution PES-Na (polyethene sodium sulfonate; c=0.001 mol/L).

Results

In Table 1 are compared properties of the IPN material of the present invention and cationic polyacrylamide.

TABLE 1

| Sample | Wt. % of copolymer of vinylamine-vinylformamide (based on wt. % of monomers acrylamide and cationic acrylic acid) | Salt viscosity (cP) 18/6 | 18/30 | Insolubles | Charges (meq/g) (Mutek) pH = acid (2.5) | pH = neutral |
|---|---|---|---|---|---|---|
| HM-0 | 0 | 81 | 40 | 5 | 1.40 | 1.19 |
| HM-1 | 5.2 | 44.5 | 27 | 0 | 1.72 | 1.42 |
| HM-2 | 6.6 | 28 | 19.3 | 13 | 1.63 | 0.98 |

HM-0 is dry cationic polyacrylamide

HM-1 and HM-2 are the IPN material of the present invention (cationic polyacrylamide forming the IPN material together with the copolymer of vinylamine-vinylformamide) in aqueous solution.

As can be seen from Table 1, the HM-1 and HM-2 of the present invention has different properties than the cationic polyacrylamide, and thus different product than the cationic polyacrylamide (HM-0).

SCT Strength Test

SCT strength was studied by comparing SCT strength of the IPN material of the present invention (HM-3) with cationic polyacrylamide (HM-0), copolymer of vinylamine-vinylformamide (PV-500) and blend (HM-0 & PV-500) of cationic polyacrylamide and copolymer of vinylamine-vinylformamide.

The IPN material of the present invention, the cationic polyacrylamide and the blend were produced with the above described methods. The blend had same amounts of cationic polyacrylamide and copolymer of vinylamine-vinylformamide as the IPN material of the present invention.

Short span compression test (SCT) is a horizontal equipment with a distance of 0.7 mm between the fixing legs. The equipment from Lorentzen & Wettre uses straight test stripes. It measures the compression strength of liner and fluting. Details regarding the measurements are shown in Table 2.

TABLE 2

| Measurement | Device | Standard |
|---|---|---|
| Basis weight | Mettler Toledo | ISO 536 |
| SCT (Short Span Compression Test) | Lorentzen & Wettre Compression Strength Tester | ISO 9895 |
| Burst strength | Lorentzen & Wettre Bursting Strength Tester | ISO 2758 |

Preparation of the pulp: paper (disintegrated OCC stock) was first cut to 2×2 cm pieces. Water was heated to 50° C., and 2.7 liters per batch were used. Paper was added to the water until 2% consistency was reached (paper 20 g/l water). Biocide Fennosan GL 10 (100 ppm) was added if the test was continued on the following day (100 ppm of biocide was added every 24 hours). The waiting time was 10 min before the disintegration was started. The number of rotation in disintegration was 50 000. The pulp was slashed with wet-disintegrator on the morning of the test day.

Table 3 presents the results of the SCT strength measurements.

TABLE 3

SCT strength (SCT index 14% ash, Nm/g).

| Sample | Dosage, 0 kg/t dry | Dosage, 0.4 kg/t dry |
|---|---|---|
| HM-0 | 19.64 | 19.59 |
| PV-500 | 19.64 | 20.39 |
| HM-3 | 19.64 | 20.61 |
| HM-0 & PV-500 (92.5/7.5) | 19.64 | 20.33 |

As can be seen from the Table 3, the HM-3 (the IPN material of the present invention) exhibits improved SCT strength compared to the other tested samples.

Drainage Test

Drainage was studied by comparing drainage time of the IPN material of the present invention (HM-3) with cationic polyacrylamide (HM-0), copolymer of vinylamine-vinylformamide (PV-500) and blend (HM-0 & PV-500) of cationic polyacrylamide and copolymer of vinylamine-vinylformamide with different dosages.

The IPN material of the present invention, the cationic polyacrylamide and the blend were produced with the above described methods. The blend had same amounts of cationic polyacrylamide and copolymer of vinylamine-vinylformamide as the IPN material of the present invention.

A Dynamic Drainage Analyzer, DDA, (AB Akribi Kemikonsulter, Sweden) was used to measure drainage. DDA's vacuum and stirrer were calibrated and necessary adjustments to the settings were made. DDA was connected to a computer for measuring the time between an application of vacuum and the vacuum break point. A change of the vacuum expresses the forming time of a wet fiber web until air breaks through the thickening web indicating the drainage time. The mixing speed was 1 200 rpm and wire was 0.25 mm. Chemicals were added 15 s before the drainage. Vacuum is 300 mbar and suction time is 30 s. After the draining, weight of the sheet is measured. Two platter papers are put on both sides. The sheet is pressed for one minute in 4 bar pressure, immediately after the draining. Sheet is weighted after wet pressing, dried in Lorentzen & Wettre hot plate dryer for 10 min between plotter paper on each side of the sheet, and 1 min additionally without plotter paper. Then, the sheet is weighted again. The pulp, which was tested, had the following properties (Table 4).

TABLE 4

| Characteristic | | Device/standard |
| --- | --- | --- |
| pH | 6.76 | Knick Portamess 911 |
| Conductivity (µS/cm) | 3540 | Knick Portamess 911 |
| Charge (µekv/l) | −364 | Mütek PCD 03 |
| Zeta potential (mV) | −5.4 | Mütek SZP 06 |
| Consistency (g/l) | 3.55 | ISO 4119 |
| Ash (%) | 18.27 | ISO 1762 |

In Table 5 are shown the results of the drainage measurements.

TABLE 5

| | wire solids, % | press solids, % |
| --- | --- | --- |
| 0-test | 23.9 | 50.1 |
| HM-0 | 24.4 | 50.5 |
| Fennopol K3400R | 23.9 | 49.7 |
| PV500 | 23.8 | 50.7 |
| HM-3 | 24.8 | 51.2 |
| HM-0 + PV-500 | 24.2 | 50.5 |

As can be seen from Table 5, the HM-3 (the IPN material of the present invention) exhibits improved drainage compared to other tested samples.

The invention claimed is:

1. A process for producing an interpenetrating network (IPN) material comprising:
   i) providing an aqueous solution comprising a copolymer of vinylamine-vinylformamide, and at least one monomer selected from a group consisting of acrylamide or derivatives thereof, acrylic acid or derivatives thereof, or a mixture thereof;
   ii) polymerizing in situ the at least one monomer selected from the group consisting of acrylamide or derivatives thereof, acrylic acid or derivatives thereof, or a mixture thereof to form the IPN material together with the copolymer of vinylamine-vinylformamide; and
   iii) obtaining the IPN material.

2. The process according to claim 1, wherein the acrylamide derivative is selected from a group consisting of N-methylolacrylamide, N-methylol(meth)acrylamide, N,N-dimethylaminopropyl acrylamide, N, N-dimethylaminopropylacrylamide, N, N-dimethylaminopropylmethacrylamide, N-dimethylaminoethylacrylamide, N-[2-(dimethylamino)-1,1-dimethylethyl]acrylamide; and
   the acrylic acid derivative is selected from cationic acrylic acid or anionic acrylic acid.

3. The process according to claim 2, wherein the cationic acrylic acid is selected from a group consisting of 2-(acryloyloxy)ethyl]trimethylammonium chloride, (3-acrylamidopropyl)trimethyl ammonium chloride, 2-(diethylamino) ethyl acrylate, 2-(dimethylamino)ethyl acrylate, [2-(methacryloyloxy)ethyl]-trimethylammonium chloride, [3-(methacryloylamino)propyl]trimethylammonium chloride.

4. The process according to claim 2, wherein the anionic acrylic acid is selected from a group consisting of acrylic acid, acryloyl chloride, methacrylic acid, 2-acrylamido-2-methylpropane sulfonic acid, sodium 2-(acryloylamino)2-methyl-1-propanesulfonate.

5. The process according to claim 1, wherein the at least one monomer are acrylamide and cationic acrylic acid; and acrylamide and [2-(acryloyloxy)ethyl]-trimethyl ammonium chloride.

6. The process according to claim 1, wherein the copolymer of vinylamine-vinylformamide a has degree of hydrolysis 1-99%.

7. The process according to claim 1, wherein the copolymer of vinylamine-vinylformamide has degree of hydrolysis 99-100%.

8. The process according to claim 1, wherein there is present a cross-linking agent in the step ii), the cross-linking agent present in the step ii) is selected from a group consisting of N,N'-methylenebisacrylamide 1,4-bis(acryloyl)piperazine, N,N'-(1-methyl-1,2-ethanediyl)bis(2-propenamide), N,N'-propylidenebis(2-propenamide), N, N'-butylidenebis(2-propenamide), N, N'-1,12-dodecanediylbis(2-propenamide), N, N'-1,9-nonanediylbis(2-propenamide), N,N'-1,5-pentanediylbis(2-propenamide), N, N'-1,4-butanediylbis(2-propenamide), N, N'-1,6-hexanediylbis(2-propenamide), N,N'-ethylidenebis(2-propenamide), N,N'-1,3-propanediylbis(2-propenamide), N, N'-1,2-ethanediylbis(2-propenamide), N,N'-1,4-cyclohexanediylbis(2-propenamide), N, N'-1,8-octanediylbis(2-propenamide), N,N'-bisacryloyly imidazoline, ethyleneglycol dimethacrylate, 1,4-diacroyl piperazine, pentaerythritol triacrylate, trimethylpropane trimethylacrylate, pentaerythritol tetraacrylate or N,N'-methylenebisacrylamide.

9. The process according to claim 1, wherein the obtained IPN material from iii) is dried or dried and milled.

10. The process according to claim 1, wherein an amount of the copolymer of vinylamine-vinylformamide is 0.1-75 wt. % based on the weight of the monomers in the solution.

11. An interpenetrating polymer network (IPN) material comprising:
    copolymer of vinylamine-vinylformamide; and
    a homopolymer or a copolymer of at least one monomer selected from acrylamide or derivatives thereof, acrylic acid or derivatives thereof, or a mixture thereof forming the IPN material together with the copolymer of vinylamine-vinylformamide, wherein the copolymer of vinylamine-vinylformamide has a degree of hydrolysis between 1-99%.

12. The IPN material according to claim 11, wherein the homopolymer or the copolymer is cationic.

13. The IPN material according to claim 11, wherein the polymer is a copolymer of acrylamide and cationic acryl acid.

14. The IPN material according to claim 11, wherein the IPN material is in a form of an emulsion.

15. The IPN material according to claim 11, wherein standard viscosity of the IPN material is 1-5 cP, measured with Brookfield viscometer using UL adapter at 25° C.

16. The IPN material according to claim 11, wherein an amount of the copolymer of vinylamine-vinylformamide is 0.1-75 wt. % based on the weight of the IPN material.

17. The IPN material according to claim 11, wherein the copolymer of vinylamine-vinylformamide has degree of hydrolysis 99-100%.

* * * * *